March 23, 1937.  S. FREY  2,074,607
GATE FOR IRRIGATION PIPES AND THE LIKE
Filed July 31, 1931
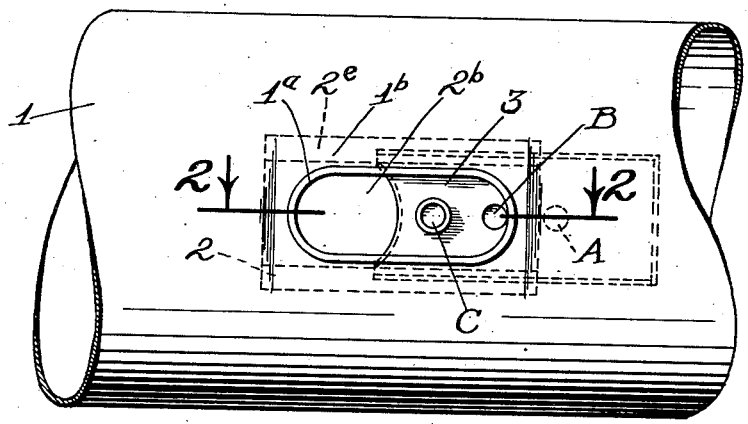
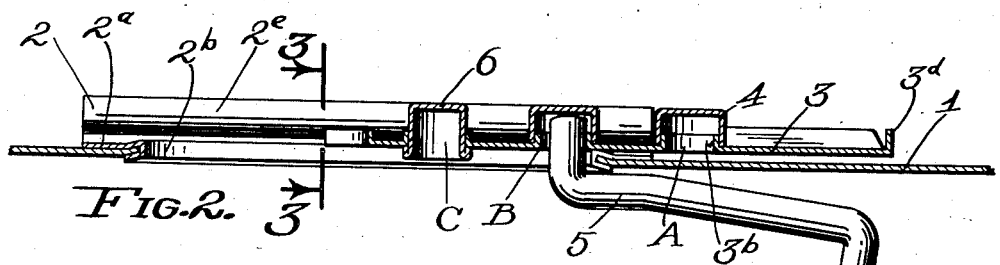
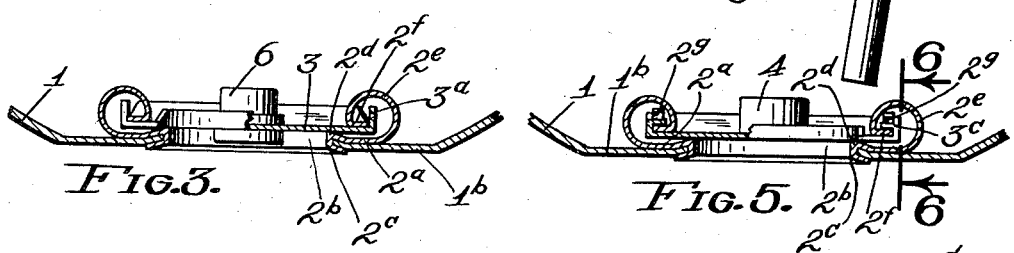
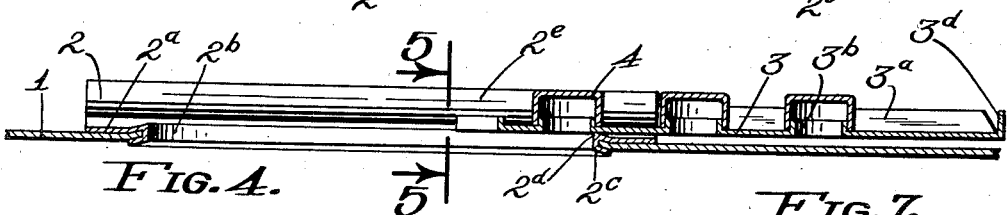
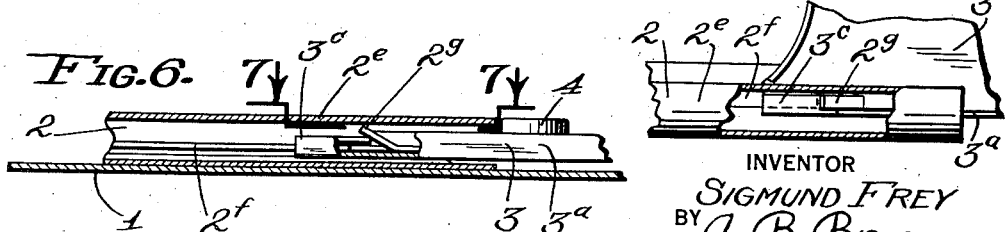
INVENTOR
SIGMUND FREY
BY A. B. Bowman
ATTORNEY Patented Mar. 23, 1937

2,074,607

UNITED STATES PATENT OFFICE 2,074,607

GATE FOR IRRIGATION PIPES AND THE LIKE

Sigmund Frey, Los Angeles, Calif.

Application July 31, 1931, Serial No. 554,256

5 Claims. (Cl. 137—13)

My present invention relates to a gate or gate structure for irrigation pipes and the like.

In surface irrigation pipe construction in use at the present time, valves or gates are employed and fitted at intervals along the side of the pipe in such a manner that water may be discharged therefrom when and at the place desired. The valves or gates now in use are secured to the outside of the sheet metal pipe. In transporting or hauling the pipe sections from place to place and in placing one on top of the other on trucks or for storing, or other purposes, and particularly when sliding the pipe sections over or against each other when loading and unloading the same, such valves or gates are often battered, bent, crushed, or otherwise damaged, and even broken from the pipe sections. In order to prevent such injury, considerable care must be exercised which requires unnecessary waste of time, effort and equipment.

An important object of this invention is to eliminate such damage to the valves or gates and to the pipe sections, and also the difficulty encountered in the conveying of the pipe sections from place to place and in loading and unloading the same on and from conveyances, and in other handling, such elimination of the aforementioned difficulties being effected by placing the valve or gate on the inside of the pipe.

Another object of this invention is to relieve the user from guess work in selecting the proper size of gate for irrigation pipe, and also to reduce the expense of manufacturing and carrying in stock of various sizes of valves or gates for such purposes, by providing a gate structure whereby various size openings in the pipe may be readily obtained without material additional expense in manufacturing, and without any additional effort on the part of the user.

Another object of this invention is to provide a valve structure whereby a relatively large opening may be provided in a pipe of relatively small diameter.

A still further object of this invention is to provide simple and economical means for opening and closing the gate and for gauging various sizes of openings of the gate.

A further object of this invention is to provide novel means of limiting the extreme open position of the gate and of retaining the gate in its proper mounting with respect to the pipe.

A further object of this invention is to provide as a whole a novelly constructed gate and mounting, and a gate structure which is very simple and economical, one which may be used in connection with various classes of pipes, receptacles, bins, or other enclosures, and a gate structure which will not readily deteriorate or get out of order.

With these and other objects in view, as will appear hereinafter, I have devised a gate structure having certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a side view of a pipe incorporating my invention in one form; Fig. 2 is an enlarged longitudinal fragmentary sectional view thereof taken through 2—2 of Fig. 1; Fig. 3 is a transverse fragmentary sectional view thereof taken through 3—3 of Fig. 2; Fig. 4 is a fragmentary longitudinal sectional view, similar to that shown in Fig. 2, but of a slightly modified form of construction; Fig. 5 is a transverse fragmentary sectional view thereof taken through 5—5 of Fig. 4; Fig. 6 is a fragmentary sectional view thereof taken through 6—6 of Fig. 5; and, Fig. 7 is a fragmentary sectional view thereof taken through 7—7 of Fig. 6.

Like characters of reference refer to similar parts and portions throughout the views of the drawing.

Figure 1 shows a fragmentary section of a common surface irrigation pipe 1, which is usually made of sheet metal. In the side of the pipe is provided an opening 1a which, for various purposes of my invention, is elongated, the longitudinal axis thereof extending longitudinally with respect to the longitudinal axis of the pipe. For convenience of manufacture, the ends of the elongated opening are rounded as shown.

On the inside of the pipe is mounted the gate supporting member or cage 2. This supporting member or cage is provided with a plate portion 2a which is positioned against the inner side of a flattened portion 1b in which the opening 1a is located. The plate 2a is provided with an elongated opening 2b conforming with the opening 1a. This opening 2b is surrounded by an outwardly extending flange 2c which extends through the opening 1a and is bent over the edge of the opening against the outer side of the pipe. At the inner side of the supporting member 2 and around the opening 2b is provided a seat 2d, formed by bending the plate portion 2a slightly inwardly.

At the opposite longitudinal edges of the member 2 are provided large resilient beads 2e which are rolled inwardly from the wall of the pipe and, at the edges of the rolled portions, are spaced from the plate portion 2a. Against the seat 2b is positioned and slidably mounted the gate 3, the longitudinal edges of the gate extending within the bears 2e. The free edges of these beads force the gate 3 into a yieldable and resilient engagement with the seat 2d. It will be here also noted that by reason of the location of the gate on the inside of the pipe, the water therein also tends to force the gate against the seat instead of away from the seat as when the gate is positioned on the outside of the pipe. The longitudinal edges of the gate are also provided with outwardly extending flanges 3a which engage the free edges of the beads and thus locate or guide the gate in its longitudinal movement.

In the gate 3 are provided a multiplicity of holes 3b which are spaced longitudinally from each other. These holes are surrounded by annular flanges at the inner side of the gate. To and around these flanges are secured cup shaped members 4 for enclosing the inner ends of the holes against the escape of water from the pipe. The holes 3b with the cup shaped members 4 form inwardly extending recesses for the reception of a tool, key, or other instrument 5 for shifting the gate from the outside of the pipe through the opening 1a in the pipe. This tool or key may be merely a straight piece of metal or a hook member to suit the convenience of the operator. In addition to the provision of means for receiving a key or tool, the recesses receive such means for the purpose of limiting the shifting of the gate by reason of the engagement of the key or tool against the flange 2c of the supporting member, as shown in Figs. 1 and 2. The holes or recesses 3b are so spaced that when the key is placed in the first hole A and the gate shifted to its extreme position with the key in the hole A, only a small portion of the hole A is uncovered. If the key is placed in the recess B, a larger portion of the opening is uncovered, and if the key is placed in the recess C, the gate is opened to its extreme position.

In order to provide an economical and simple means of limiting the extreme open and closed positions of the gate, the cup shaped member, designated 6, forming the recess C, is extended with its open end beyond the outer side of the gate 3 forming an annular flange around the recess. This annular flange engages the flange portions 2c at the ends of the opening 2b and thus limits the extreme position.

In the modified structure shown in Figs. 4, 5, 6 and 7, all of the cup shaped members 4 and the recesses A, B and C are of the same construction. But in this instance, other stop means are provided. In this instance the flange 2f at the free portion of the beads 2e is provided near one end with an outwardly struck resilient retainer 2g, as shown in Figs. 6 and 7. The flange 3a in this instance is also provided at the opposite end with respect to the end of the supporting member provided with the retainer, with a backwardly turned catch portion or lug 3c, shown in Figs. 5, 6 and 7, which is adapted to engage the retainer 2g. Such catch portions and retainers may be provided at the opposite sides of the supporting member and the gate. In order to insert the gate into position, the catch end of the gate is merely inserted into one end of the supporting member or cage with the catch portions 3c outermost with respect to the flanges 2f of the beads. As the catch portions engage the outer sides of the resilient retainers 2g, the latter are depressed permitting the catch portions to ride over the retainers. As soon as the catch portions are shifted beyond the retainers, the retainers snap outwardly and prevent the removal or withdrawal of the gate beyond the position shown in Fig. 6.

When employing the last mentioned stop or means, an inwardly bent flange 3d, at the end of the gate opposite the end provided with the catch portions, may be relied upon for limiting the inward or closing position of the gate.

Though I have shown and described a particular construction, combination and arrangement of parts and portions of my gate structure and a particular application thereof to surface irrigation pipe, I do not wish to be limited to this particular construction, combination and arrangement, nor to the particular application, but desire to include in the scope of my invention the construction, combination and arrangement substantially as set forth in the appended claims.

Having thus described my invention, what I claim as new and desire to secure by Letters Patent is:

1. In a gate structure, the combination with an enclosure wall having a fluid opening therein, of a supporting member secured to the wall adjacent the opening and provided with guides at the opposite sides of the opening, said guides comprising bead portions rolled outwardly from the wall, the inner portion of the beads being spaced from the main portion of the supporting member, a gate slidably mounted on the supporting member and having its edges extending into said beads, the edges of the gate having outwardly turned flanges, one end of said flanges having backwardly turned catch portions, one end of the inner portions of said beads having outwardly struck resilient retainers, said gate being slidable with respect to the supporting member with the flanges of the gate insertable into said beads with the catch portion slidable over the resilient retainer, said resilient retainer being engageable by the catch portion for preventing the removal of the gate.

2. In a gate structure for irrigation pipes, the combination with the curved wall of an irrigation pipe of a flattened portion extending longitudinally of said pipe and an oblong opening with its major axis longitudinally of said pipe in said flattened portion, said flattened portion provided with inturned portions at the edge of said opening, a supporting member clinched on both the outer and inner sides of said inturned portion and extending inwardly of said flattened portion and provided with guides at the opposite side of the opening, said guides comprising bead portions rolled inwardly from the wall, the inner portion of the beads being spaced from the main portion of the supporting member, and a gate slidably mounted on the supporting member and having its edges extending into said beads and its main portion engaging the clinched portion around said inturned portion which forms a gate seat for said gate.

3. In a gate structure for irrigation pipes, the combination with the curved wall of an irrigation pipe of a flattened portion extending longitudinally of said pipe and an oblong opening with its major axis longitudinally of said pipe in said flattened portion, said flattened portion provided with inturned portions at the edge of said opening, a supporting member clinched on both the outer and inner sides of said inturned portion and extending inwardly of said flattened portion and provided with guides at the opposite side of the opening, said guides comprising bead portions rolled inwardly from the wall, the inner portion of the beads being spaced from the main portion of the supporting member, and a gate slidably mounted on the supporting member and having its edges extending into said beads and its main portion engaging the clinched portion around said inturned portion which forms a gate seat for said gate, said gate having a recess extending inwardly with respect to the gate and accessible from the outer side of said gate through the opening for receiving a key for shifting the gate.

4. In a gate structure for round irrigation pipes, the combination with a pipe wall having an elongated fluid opening with the edge surrounding said opening turned inwardly forming a straight inner surface longitudinally of said pipe, of a supporting member positioned at the inner side of and clinched around the inturned edge of said wall around said opening forming a straight seat longitudinally of said pipe at the inner side of the edge of said opening and provided with guides at the opposite sides of the opening extending inwardly of said pipe, and a gate slidably mounted at its opposite edges between said guides and the seat formed by the clinched portion of said supporting member.

5. In a gate structure for round irrigation pipes, the combination with a pipe wall having an elongated fluid opening with the edge surrounding said opening turned inwardly forming a straight inner surface longitudinally of said pipe, of a supporting member positioned at the inner side of and clinched around the inturned edge of said wall around said opening forming a straight seat longitudinally of said pipe at the inner side of the edge of said opening and provided with guides at the opposite sides of the opening extending inwardly of said pipe, and a single plate gate slidably mounted at its opposite edges between said guides and the seat formed by the clinched portion of said supporting member.

SIGMUND FREY.